(12) United States Patent
Kawakami et al.

(10) Patent No.: US 11,259,071 B2
(45) Date of Patent: *Feb. 22, 2022

(54) CONTENT DISTRIBUTION SERVER, CONTENT DISTRIBUTION SYSTEM, CONTENT DISTRIBUTION METHOD, AND PROGRAM

(71) Applicant: DWANGO Co., Ltd., Tokyo (JP)

(72) Inventors: Nobuo Kawakami, Tokyo (JP); Kentarou Matsui, Hokkaido (JP); Shinnosuke Iwaki, Tokyo (JP); Takashi Kojima, Tokyo (JP); Naoki Yamaguchi, Hokkaido (JP)

(73) Assignee: DWANGO Co., Ltd.

( * ) Notice: Subject to any disclaimer, the term of this patent is extended or adjusted under 35 U.S.C. 154(b) by 0 days.

This patent is subject to a terminal disclaimer.

(21) Appl. No.: 17/257,549

(22) PCT Filed: Jul. 23, 2019

(86) PCT No.: PCT/JP2019/028803
§ 371 (c)(1),
(2) Date: Dec. 31, 2020

(87) PCT Pub. No.: WO2020/044875
PCT Pub. Date: Mar. 5, 2020

(65) Prior Publication Data
US 2021/0289251 A1   Sep. 16, 2021

(30) Foreign Application Priority Data
Aug. 31, 2018 (JP) .............................. JP2018-162655

(51) Int. Cl.
*H04N 21/431* (2011.01)
*H04N 21/258* (2011.01)
(Continued)

(52) U.S. Cl.
CPC ....... *H04N 21/4312* (2013.01); *H04N 21/258* (2013.01); *H04N 21/262* (2013.01); *H04N 21/4302* (2013.01)

(58) Field of Classification Search
CPC ............. H04N 21/4312; H04N 21/258; H04N 21/262; H04N 21/4302
(Continued)

(56) References Cited

U.S. PATENT DOCUMENTS

| | | | |
|---|---|---|---|
| 7,139,767 B1* | 11/2006 | Taylor | ..................... G06F 16/50 |
| 8,523,673 B1* | 9/2013 | Boyd | ................... A63F 13/215 |
| | | | 463/34 |
| 2005/0010637 A1* | 1/2005 | Dempski | ............. H04L 65/4053 |
| | | | 709/204 |

FOREIGN PATENT DOCUMENTS

| | | |
|---|---|---|
| JP | 2014529792 A | 11/2014 |
| JP | 2018517444 A | 7/2018 |

OTHER PUBLICATIONS

PCT/JP2019/028803 International Search Report and Written Opinion dated Oct. 8, 2019, 2 pgs.

* cited by examiner

*Primary Examiner* — Dominic D Saltarelli
(74) *Attorney, Agent, or Firm* — Bracewell LLP; Douglas F. Stewart; Patrick J. Connolly

(57) ABSTRACT

Provided is a content distribution server that is configured to distribute live content according to additional information set for a virtual character. The content distribution server comprises: an information acquiring unit that acquires character information indicating a virtual character used by a distributor in a virtual space, and first additional information added to the character information; and a distribution unit that distributes live content for synthesis with video in virtual space converting movement by the distributor to
(Continued)

movement by the virtual character based on the character information and the first additional information acquired by the information acquiring unit.

7 Claims, 10 Drawing Sheets

(51) Int. Cl.
    *H04N 21/262*     (2011.01)
    *H04N 21/43*     (2011.01)

(58) Field of Classification Search
    USPC .......................................................... 725/34
    See application file for complete search history.

[Fig. 1]
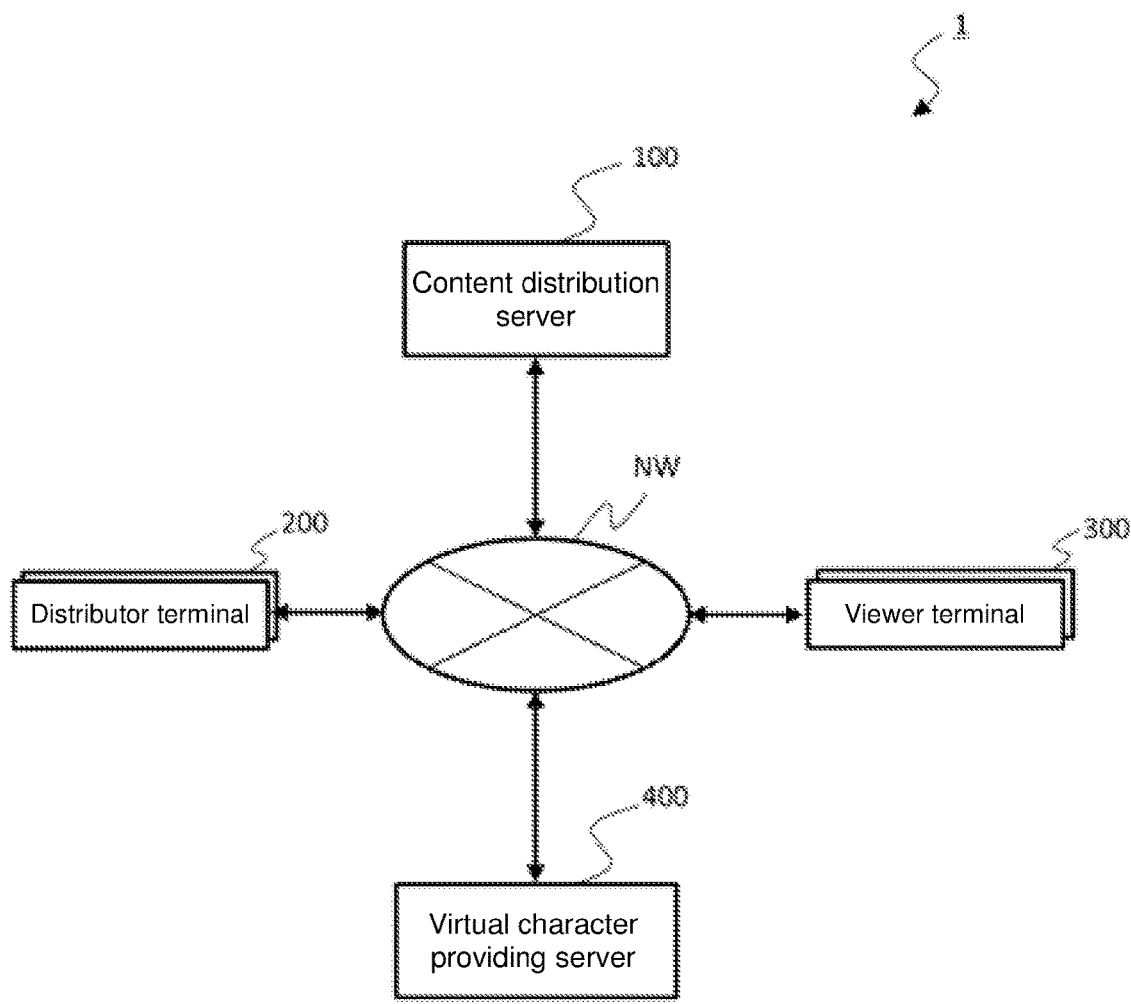

[Fig. 2]
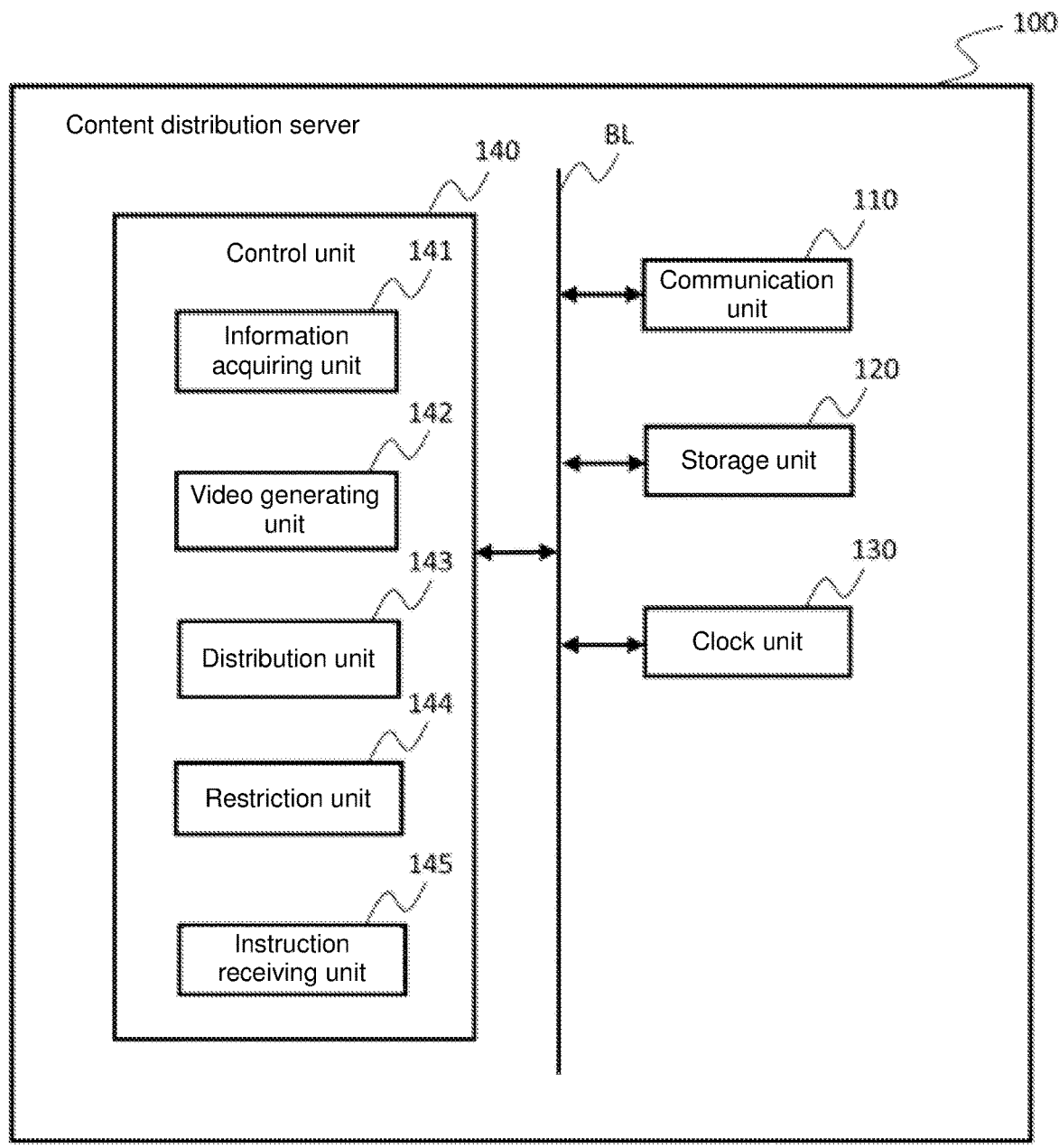

[Fig. 3]
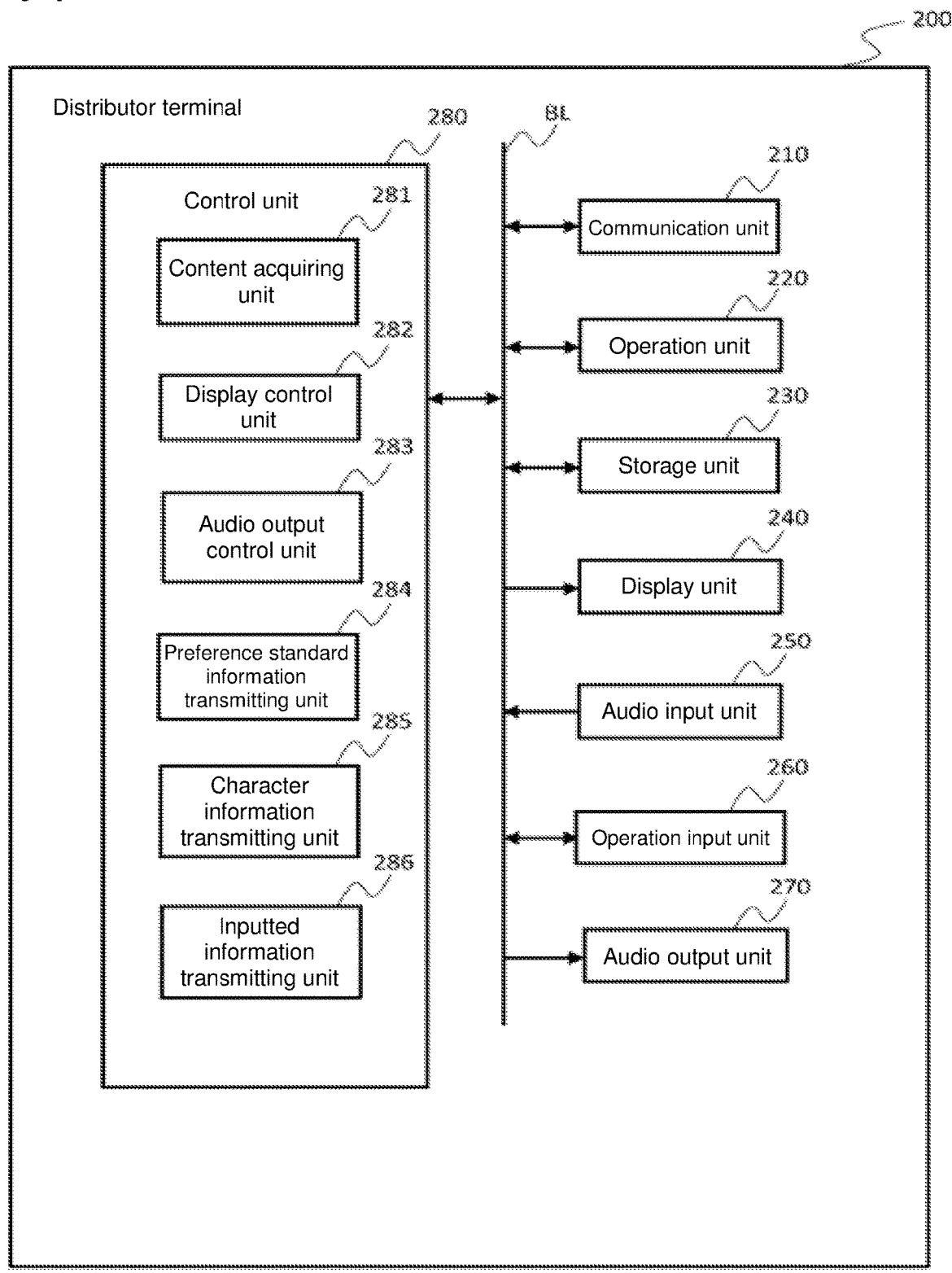

[Fig. 4]
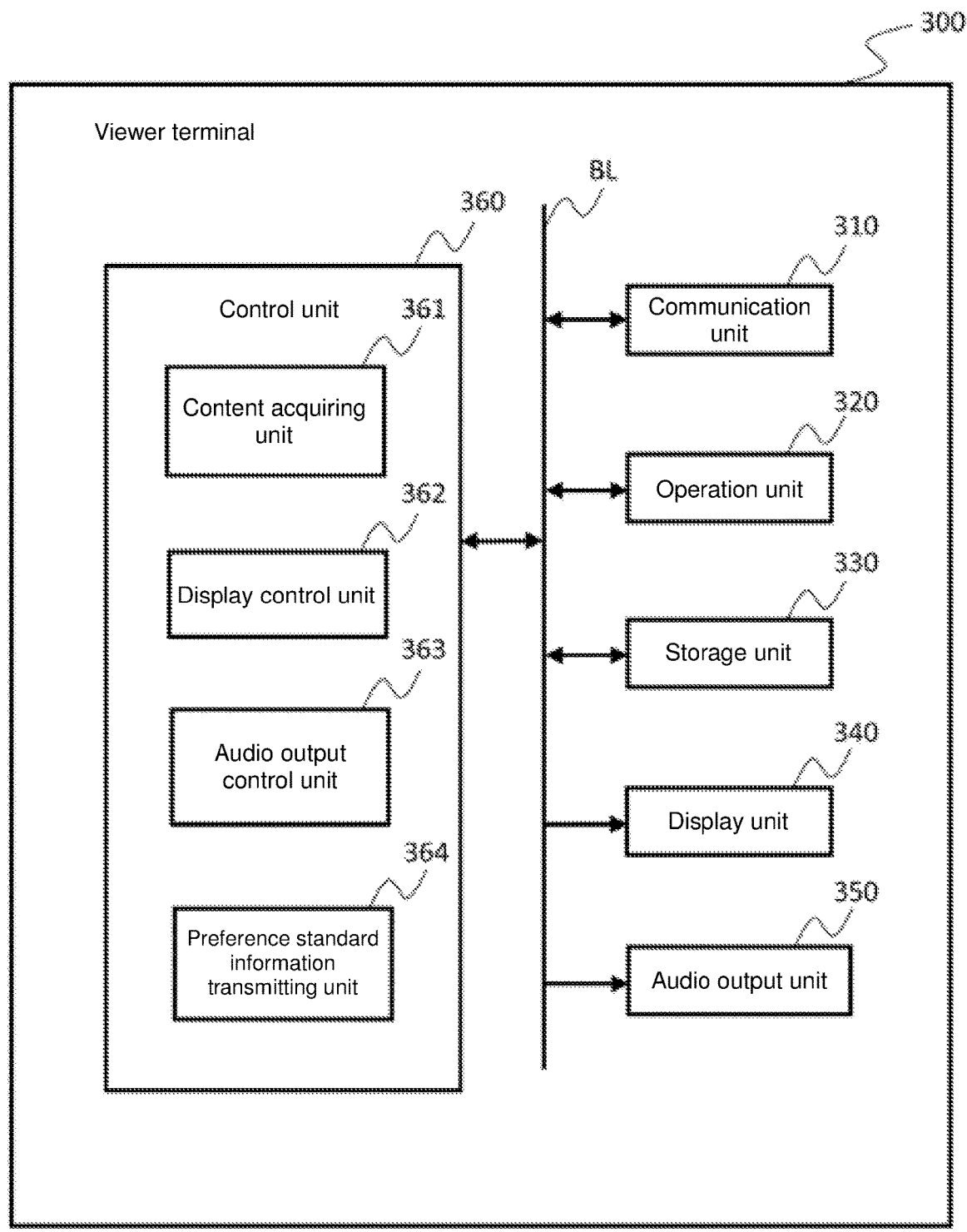

[Fig. 5]
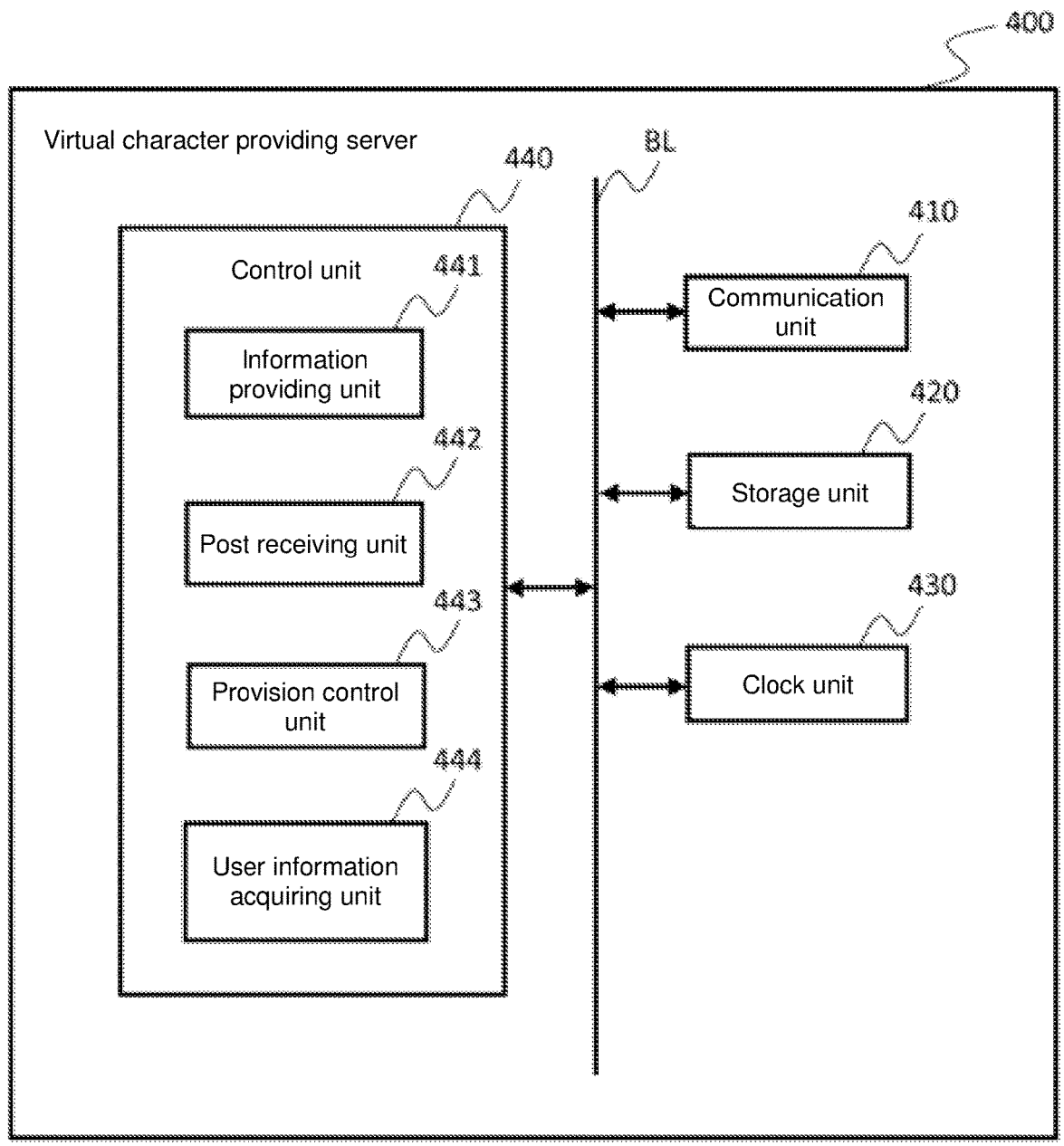

[Fig. 6]

| Poster ID | Info ID | Info Type | Distribution Status | Size | Remarks | URL |
|---|---|---|---|---|---|---|
| tokkuy-s1 | 71B6A1 | Character | Being Distributed | 17.4 MB | No restrictions | http://... |
| isho674 | 1715B1 | Character | Being Distributed | 11.6 MB | Expresses sexuality | http://... |
| 35shohy | 43A25D | Character | Distribution Ended | 15.4 MB | Nationality restrictions | http://... |
| jitu4yo | A66CE6 | Object | Being Distributed | 4.1 MB | Religious content | http://... |
| chosaK | 2B615B | Object | Suspended | 6.3 MB | Tobacco | http://... |

[Fig. 7]
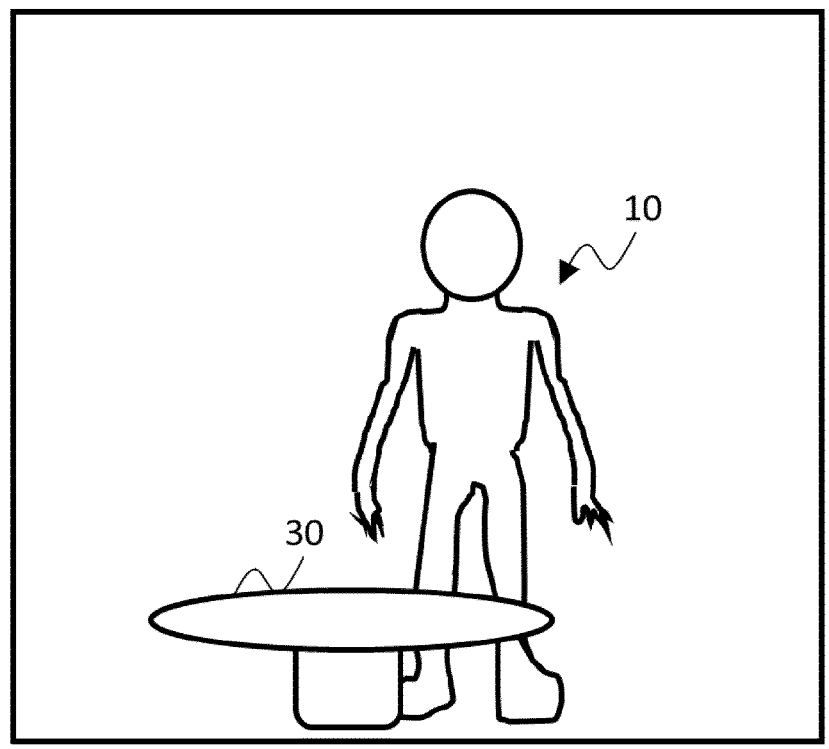

[Fig. 8]
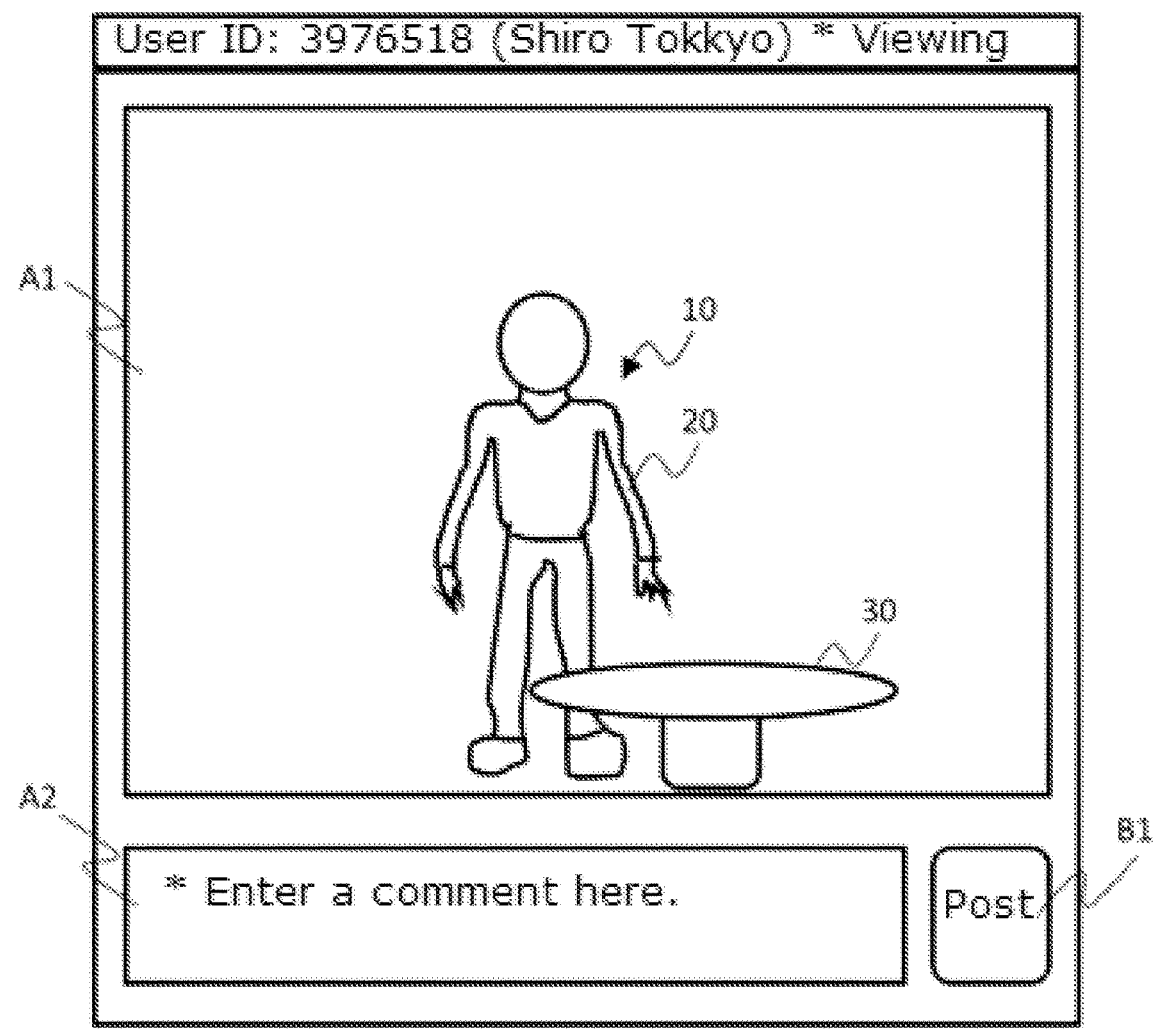

[Fig. 9]
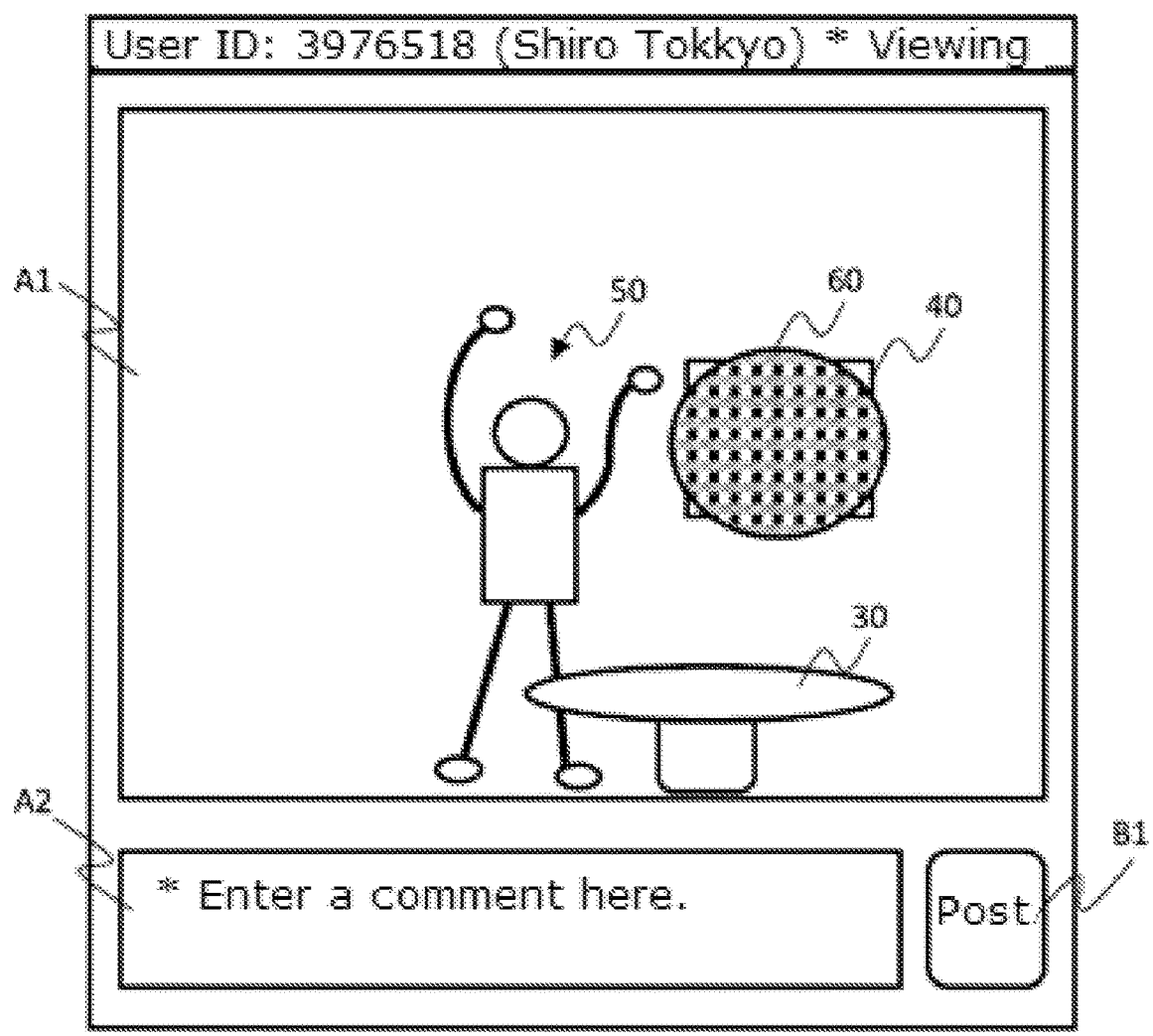

[Fig. 10]
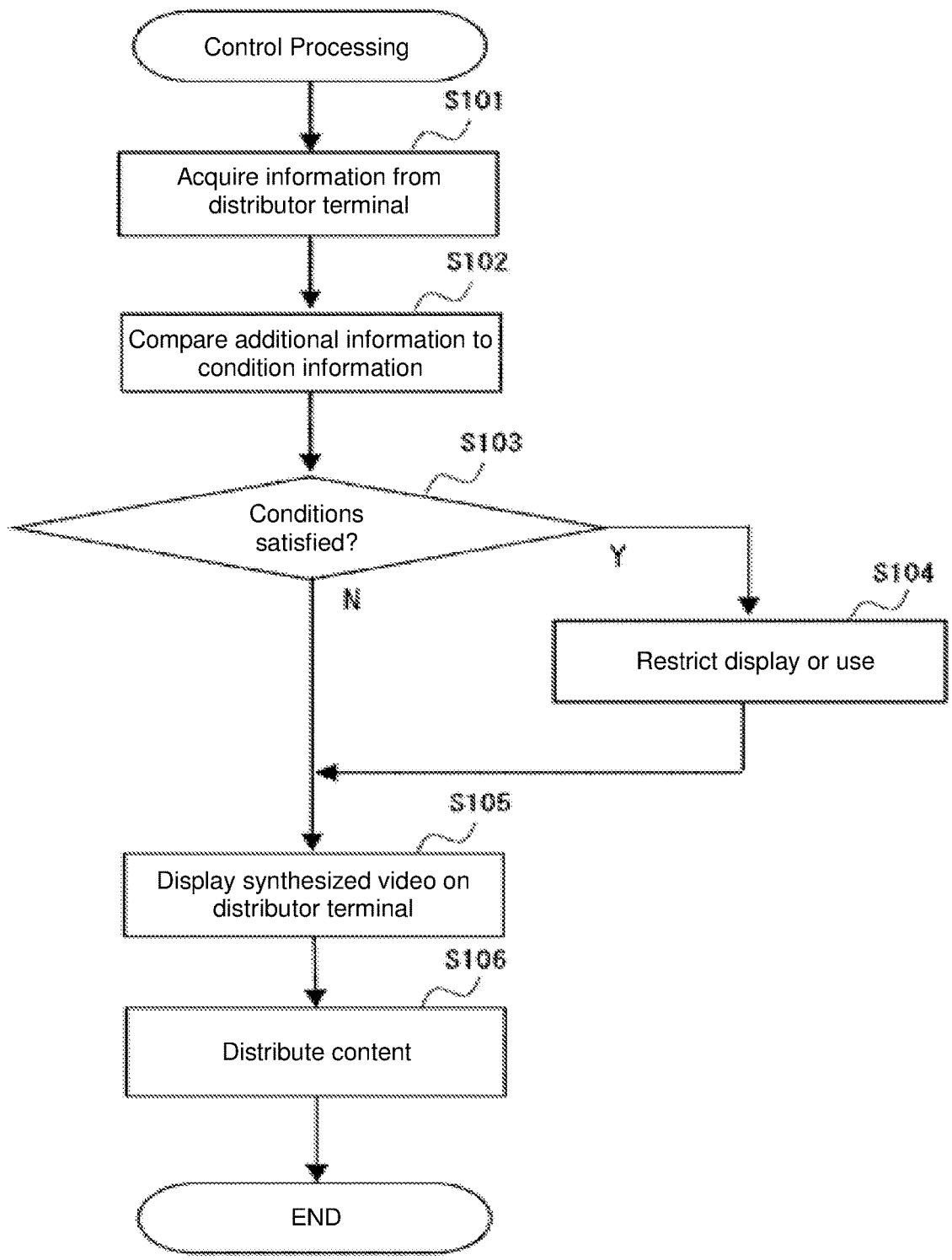

… (1)

CONTENT DISTRIBUTION SERVER, CONTENT DISTRIBUTION SYSTEM, CONTENT DISTRIBUTION METHOD, AND PROGRAM

TECHNICAL FIELD

The present disclosure relates to a content distribution server, a content distribution system, a content distribution method, and a program.

BACKGROUND ART

In recent years, services that deliver live content via a network have become widespread as live broadcasting over the internet. Technologies been proposed for live broadcasting over the internet in which the distributor appears as a virtual character (avatar) in virtual space in video that is distributed as live content. In this live content, video is distributed in which movements by the distributor are synthesized as movements by a virtual character using motion capture technology.

For example, a system is disclosed in Patent Document 1 in which performers and spectators wearing HMDs (head mounted displays) participate in games and video as virtual characters, and video captured from multiple viewpoints is distributed over multiple channels. Patent Document 1 also discloses a technique in which viewers viewing distributed content participate in the distributed content as characters trained on a game device related to the distributed content.

PRIOR ART DOCUMENTS

Patent Documents

Patent Document 1: JP 2002-271693 A

SUMMARY OF THE INVENTION

Problem to be Solved by the Invention

In live broadcasting over the internet, a plurality of distributors may jointly create live content and distribute video in which the plurality of distributors appears together. This type of distributed content is required even for live broadcasting over the internet in which the distributor appears as a virtual character in virtual space.

Preferably, this type of distributed content can be realized via a network even when a plurality of distributors is located apart from each other in real space. For example, video in which a plurality of virtual characters corresponding to a plurality of distributors appearing together can be distributed as live content by having virtual characters that reflect the actions of the plurality of distributors appear in the same virtual space.

In a system in which a plurality of distributors (including viewers participating in the distributed content) participate as virtual characters via a network, additional information is preferably set for virtual characters that will be accepted by the system. This makes it possible for virtual characters prepared by a plurality of distributors to appear together.

When a plurality of distributors acquires virtual characters from other servers and use them, the display or use of some virtual characters may have to be restricted based on the viewers' age, nationality, or religious preferences. For example, naked browsing requires an age limit. If there are no restrictions, there is a risk that virtual characters that should not be participating will be used by distributors. When an unspecified number of participants (such as other distributors or viewers) participate as virtual characters in distributed content from a distributor, and even one of the participants uses a prohibited virtual character, the distributed content itself may be regulated or prohibited against the wishes of the distributor.

Therefore, when the number of virtual characters used in distributed content is high or unspecified participants participate using virtual characters, information related to virtual characters is preferably filtered using uniform restrictions. If additional information is set for virtual characters, the use or display of undesirable virtual characters in distributed content can be easily restricted.

Patent Document 1 discloses a technique in which the characters used by viewers in a game simply appear in the distributed content. It does not disclose a technique in which additional information is set for virtual characters that reflects the behavior of the distributor.

In view of these circumstances, it is an object of the present disclosure to provide a content distribution server etc. that is able to distribute live content based on additional information set for a virtual character.

Means for Solving the Problem

In order to achieve this object, a first aspect of the present invention is a content distribution server comprising: an information acquiring unit that acquires character information indicating a virtual character used by a distributor in virtual space and first additional information added to the character information; and a distribution unit that distributes live content for synthesizing video in virtual space with movement by the distributor as movement by the virtual character based on the character information and the first additional information acquired by the information acquiring unit.

In order to achieve this object, a second aspect of the present invention is a content distribution system comprising: a content distribution server that distributes live content based on video in virtual space that synthesizes movement by a distributor as movement by a virtual character; and a virtual character providing server that provides character information indicating the virtual character and first additional information added to the character information, wherein the content distribution server distributes live content for synthesizing video in virtual space with movement by the distributor as movement by the virtual character based on the character information and the first additional information acquired from the virtual character providing server.

In order to achieve this object, a third aspect of the present invention is a content distribution method comprising: an information acquisition step of acquiring character information indicating a virtual character used by a distributor in virtual space and first additional information added to the character information; and a distribution step of distributing live content for synthesizing video in virtual space with movement by the distributor as movement by the virtual character based on the character information and the first additional information acquired in the information acquisition step.

In order to achieve this object, a fourth aspect of the present invention is a program causing a computer to function as an information acquisition means for acquiring character information indicating a virtual character used by a distributor in virtual space and first additional information added to the character information; and a distribution means for distributing live content for synthesizing video in virtual space with movement by the distributor as movement by the virtual character based on the character information and the first additional information acquired by the information acquisition means.

Effects of the Invention

The present disclosure is able to provide a content distribution server etc. that is able to distribute live content based on additional information set for a virtual character.

BRIEF DESCRIPTION OF THE DRAWINGS

FIG. 1 is a diagram showing the configuration of the content distribution system in an embodiment of the present invention.

FIG. 2 is a block diagram showing the configuration of the content distribution server in the embodiment of the present invention.

FIG. 3 is a block diagram showing the configuration of the distributor terminal in the embodiment of the present invention.

FIG. 4 is a block diagram showing the configuration of the viewer terminal in the embodiment of the present invention.

FIG. 5 is a block diagram showing the configuration of the virtual character providing server in the embodiment of the present invention.

FIG. 6 is a table showing an example of information provided by the virtual character providing server in the embodiment of the present invention.

FIG. 7 is a diagram showing an example of video in virtual space displayed on the distributor terminal in the embodiment of the present invention.

FIG. 8 is a diagram showing a first example of a distribution screen displayed on the viewer terminal in the embodiment of the present invention.

FIG. 9 is a diagram showing a second example of a distribution screen displayed on the viewer terminal in the embodiment of the present invention.

FIG. 10 is a flowchart showing an example of control processing performed by the content distribution server in the embodiment of the present invention.

EMBODIMENT OF THE INVENTION

The following is a description of an embodiment of the present disclosure with reference to the drawings. It should be noted that the embodiment described below does not place any unreasonable limits on the content of the present disclosure described in the claims. In addition, not all of the components shown in the embodiment are essential components of the present disclosure.

Embodiment

As shown in FIG. 1, the content distribution system 1 in the present embodiment includes a content distribution server 100, one or more distributor terminals 200, one or more viewer terminals 300, and a virtual character providing server 400. The content distribution server 100, one or more distributor terminals 200, one or more viewer terminals 300, and virtual character providing server 400 are connected over a network NW so as to be able to communicate with each other. The network can be, for example, a wide area network (WAN).

The content distribution server 100 provides a distribution service via the network NW. The content distribution server 100 distributes live content to the viewer terminals 300 based on video in virtual space that synthesizes movements by the distributor as movements by a virtual character.

The video in virtual space includes not only virtual characters but also a background setting and objects appearing as virtual objects. Virtual space is basically three-dimensional space generated by CG (computer graphics). Note, however, that the virtual space may also be two-dimensional space. Distributors include the distributor who manages the distributed content and distributors who participate in the distributed content. Other distributors may include viewers who wish to participate, and distributors of other distributed content.

The distributor terminal 200 is used by a distributor who distributes live content. The distributor terminal 200 is a communication terminal provided with an HMD, and has a communication function and a motion capture function. The distributor terminal 200 acquires movement (gestures) and the line of sight of the distributor as motion information with the motion capture function. The motion information is reflected in the movement of the virtual character associated with the distributor and the viewpoint (that is, rendering) in video within virtual space. The motion information may include data indicating the facial expressions of the distributor.

The viewer terminal 300 is a device having a communication function such as a personal computer, a tablet terminal, or a smartphone. The viewer terminal 300 is used by a viewer to view live content.

The virtual character providing server 400 provides character information indicating a virtual character used by a distributor in virtual space and first additional information added to the character information. The virtual character providing server 400 also provides object information indicating an object used by the distributor in virtual space and second additional information added to the object information.

The distributor uses a virtual character and objects acquired from the virtual character providing server 400 in distributed content. In the present embodiment, the virtual character providing server 400 is configured to provide both virtual characters and objects, but may be configured to provide only virtual characters or objects.

<Configuration of Content Distribution Server>

The configuration of the content distribution server 100 will now be described in detail. As shown in FIG. 2, the content distribution server 100 includes a communication unit 110 that communicates with other devices, a storage unit 120 that stores various types of data, a clock unit 130 that keeps time, and a control unit 140 for controlling the entire device. These components are connected to each other via a bus line BL.

The communication unit 110 is a communication interface including a NIC (Network Interface Card) controller for performing wired communication or wireless communication. The communication unit 110 communicates with a distributor terminal 200 and a viewer terminal 300 via a network NW.

The storage unit 120 is composed, for example, of RAM (random access memory) and ROM (read only memory). The storage unit 120 stores programs and various types of data etc. for executing various types of control processing. For example, the storage unit 120 stores condition information. The condition information is information setting conditions to restrict the controlling use or display of a virtual character or object.

The clock unit 130 can include, for example, an oscillation circuit for generating clock signals, a variable PLL (phase locked loop), and a counter circuit for counting the number of clock signal pulses. The clock unit 130 keeps the time based on the number of pulses counted.

The control unit 140 is composed of a CPU (central processing unit) etc. The control unit 140 controls the entire operation of the content distribution server 100 by executing a program stored in the storage unit 120. The control unit 140 executes various controls on timing based on the number of pulses counted by the clock unit 130. The control unit 140 also counts the elapsed time from the start of the live content based on the time kept by the clock unit 130, and determines whether or not a predetermined time (for example, the scheduled distribution time) has elapsed.

The functional configuration of the control unit 140 will now be described. The control unit 140 functions as an information acquiring unit 141, a video generating unit 142, a distribution unit 143, a restriction unit 144, and an instruction receiving unit 145.

The information acquiring unit 141 acquires information on the virtual character used by the distributor and motion information indicating the movement and line of sight of the distributor from the distributor terminal 200 via the communication unit 110. The information related to the virtual character includes information indicating the virtual character and first additional information.

The information acquiring unit 141 acquires object information indicating an object used by the distributor and second additional information from the distributor terminal 200 via the communication unit 110. The information acquiring unit 141 acquires audio information from the distributor terminal 200 via the communication unit 110.

The information acquiring unit 141 may acquire information indicating the virtual character, first additional information, object information, and second additional information directly from the virtual character providing server 400 in response to an instruction from the distributor. In other words, the information acquiring unit 141 is not limited to a configuration that acquires this information from the distributor terminal 200.

The video generating unit 142 generates video in virtual space that synthesizes the movement by the distributor as movement by the virtual character. When there is a plurality of distributors, video containing each virtual character is generated. The synthesis can be realized, for example, by generating video in which the virtual characters are present against a predetermined virtual space serving as the background, and generating video so that the virtual characters reflect movements by the distributors or participants using the virtual characters.

The distribution unit 143 distributes live content based on the video generated by the video generating unit 142. Live content based on the generated video is information indicating video rendered from each viewpoint relative to the generated video data. Specifically, the live content contains information indicating video in which the generated video is viewed from the viewpoint of the virtual character of the distributor and video (distribution screen) in which the generated video is viewed from the viewpoint of the virtual camera for distribution.

The live content distributed by the distribution unit 143 includes not only information indicating video but also audio information. The distribution unit 143 distributes audio information acquired by the information acquiring unit 141 and audio information stored in the storage unit 120 in advance and used in the production as live content.

The restriction unit 144 restricts the display or use of a virtual character when first additional information acquired by the information acquiring unit 141 satisfies a condition indicated in the condition information stored in the storage unit 120. The restriction unit 144 restricts the display or use of an object when second additional information acquired by the information acquiring unit 141 satisfies a condition indicated in the condition information stored in the storage unit 120. Restrictions on use can be restrictions on one of the following: prohibition on the use of a virtual character or object, prohibition on distributed content using a virtual character or object, and prohibition on viewing distributed content using a virtual character or object.

When limiting the display of a virtual character or object, the restriction unit 144 may execute change processing to make a change to the virtual character or object. For example, the change processing performed on a virtual character or object is processing for displaying the virtual character by applying pixelization over the virtual character or object. The change processing performed on the virtual character may be processing that changes the clothing displayed on the virtual character. The change processing performed on a virtual character or object may also be processing for changing the virtual character or object to another virtual character or object to be displayed. The change processing in the present embodiment is executed according to a distribution restriction in the content distribution server 100. However, the change process may be executed not according to a distribution restriction but according to a viewing restriction on the viewer terminal 300.

The instruction receiving unit 145 notifies the distributor terminal 200 via the communication unit 110 based on first additional information acquired by the information acquiring unit 141, and receives an instruction from the distributor terminal 200 on whether display or use of a virtual character or object is allowed or denied. The instruction receiving unit 145 may notify the administrator of the content distribution server 100 and accept an instruction to allow or deny the display or use of a virtual character or object.

The terms used in the present disclosure and the restriction method used by the restriction unit 144 will now be described. First additional information and second additional information is information used to determine whether or not a virtual character or object is subject to restriction.

First additional information includes, for example, one or more types of attribute information indicating attributes of a virtual character and certification information, which is information for certifying that the virtual character can be used. Second additional information includes, for example, one or more types of attribute information indicating attributes of an object and certification information, which is information for certifying that the object can be used.

Attribute information can be, for example, information indicating sexual content, religious content, or the attributes of a virtual character such as an animal. Certification information can be, for example, information indicating that it meets the specifications of the content distribution server 100, that it is officially approved for use, that the attribute information has been properly assigned, that it has been checked by the distributor or the administrator of the content distribution server 100, that it has been approved for use by the distributor or the administrator of the content distribution server 100, and copyright information.

Condition information stored in the storage unit 120 is used when the restriction unit 144 determines whether or not first additional information or second additional information contains undesirable information. In other words, the restriction unit 144 restricts the use of undesirable virtual characters and objects by filtering virtual characters and objects based on condition information. Condition information can include, for example, information set based on public order and moral decency standards, information set based on the preference standards of the distributor or viewer (preference standards information), and information indicating that a virtual character or object requires certification information in the first additional information or the second additional information.

Public order and moral decency standards can be, for example, standards established in accordance with restrictions based on law, age, nationality, and religion. This makes it possible to restrict the use or display of virtual characters and objects that are offensive to public order and moral decency. For example, the use or display of a virtual character indicating a highly exposed woman or man may be inappropriate if the viewer is a child, so use or display of that virtual character is restricted based on public order and moral decency standards. Information set based on the public order and moral decency standards in the condition information can be set, for example, by the administrator of the content distribution server 100.

Preference standards are standards based on the preferences of the distributor or the viewer. Preference standards depend on the distributor or the viewer, and may be set by each distributor or each viewer. Information set based on preference standards in the condition information can be set based on, for example, preference standards information acquired from the distributor terminal 200 or a viewer terminal 300. The preference standards may be set by the distributor who determines the distribution rules.

When first additional information or second additional information satisfies a condition indicated by the condition information, the restriction unit 144 may display the virtual character or the object on the distributor terminal 200, and execute restrictions on the display of virtual characters or objects on a viewer terminal 300. The preference standards will also be different if, for example, the distributor dislikes insects but the viewer prefers insects. In this case, the preference standards are used so that the distributor terminal 200 does not display a virtual character of an insect or object that is an insect, but the viewer terminal 300 will display these. Also, the viewer may like a celebrity idol that the distributor dislikes. In this case, separate preference standard may be applied to display restrictions. The restriction unit 144 may also set an NG condition that restricts the display of a virtual character or object by analogical inference from first additional information or second additional information.

Preference standards are not limited to these simple preferences. For example, the preference standards may include standards for prohibiting or restricting the use of the same virtual character by a plurality of distributors in virtual space. In this way, a situation can be avoided in which viewers cannot distinguish between distributors in distributed content. Preference standards may be standards based on the popularity of virtual characters or objects. This makes it possible for a highly popular virtual character to be used in distributed content.

<Configuration of Distributor Terminal>

The configuration of the distributor terminal 200 will now be described in detail. As shown in FIG. 3, the distributor terminal 200 includes a communication unit 210 for communicating with other devices, an operation unit 220 for receiving user operations, a storage unit 230 for storing various types of data, a display unit 240 for displaying various types of images, an audio input unit 250 for receiving audio input, an operation input unit 260 for inputting motion information, an audio output unit 270 for outputting various types of audio, and a control unit 280 for controlling the entire device. These components are connected to each other via a bus line BL.

The communication unit 210 is a communication interface including a NIC for conducting wired communication or wireless communication. The communication unit 210 communicates with the content distribution server 100 via the network NW.

The operation unit 220 can include, for example, operation buttons, a keyboard, and a pointing device, and is an interface used by the user to input instructions.

The storage unit 230 can be, for example, RAM or ROM. The storage unit 230 stores programs and inputted data for executing various types of control processing.

The display unit 240 can be, for example, an LCD (liquid crystal display) or an EL (electroluminescence) display. The display unit 240 displays text, images, etc. based on data inputted from the control unit 280.

The audio input unit 250 can be, for example, a microphone. The audio input unit 250 receives audio inputted from the outside to obtain audio information.

The operation input unit 260 receives input operations from the user as user motion information. The operation input unit 260 can be, for example, a camera or a sensor for acquiring motion information using a motion capture technology. Motion information can be detected by, for example, a sensor that senses the user's line of sight and movements (gestures). Motion information may also be acquired, for example, by pressing a button to express a facial expression on the virtual character or perform a predetermined act.

The process of converting motion information from the user into movement by or a change in the line of sight of the virtual character may be executed by the distributor terminal 200, the content distribution server 100, or the content distribution server 100 and the distributor terminal 200 working together.

The audio output unit 270 can be composed of, for example, a speaker and an amplifier. The audio output unit 270 outputs audio according to data inputted from the control unit 280.

The control unit 280 can be, for example, a CPU. The control unit 280 controls the entire operation of the distributor terminal 200 by executing a program stored in the storage unit 230.

The functional configuration of the control unit 280 will now be described. The control unit 280 functions as a content acquiring unit 281, a display control unit 282, an audio output control unit 283, a preference standard information transmitting unit 284, a character information transmitting unit 285, and an inputted information transmitting unit 286.

The content acquiring unit 281 acquires data indicating live content from the content distribution server 100 via the communication unit 210. The display control unit 282 displays video in virtual space on the display unit 240 based on the data indicating live content acquired by the content acquiring unit 281. The audio output control unit 283 outputs audio from the audio output unit 270 based on the data indicating live content acquired by the content acquiring unit 281.

The preference standard information transmitting unit 284 transmits information indicating preference standards set by the user via the operation unit 220 to the content distribution server 100 via the communication unit 210. This information is reflected in the condition information stored in the storage unit 120.

The character information transmitting unit 285 transmits character information and first additional information on the virtual character used by the user, and object information and second additional information on the object used by the user to the content distribution server 100 via the communication unit 210. This information is downloaded by the user from the virtual character providing server 400 and stored in the storage unit 230.

The inputted information transmitting unit 286 transmits audio information acquired by the audio input unit 250 and motion information acquired by the operation input unit 260 to the content distribution server 100. The inputted information transmitting unit 286 may transmit the information to the content distribution server 100 after reflecting the motion information in the virtual character.

<Configuration of Viewer Terminal>

The configuration of the viewer terminal 300 will now be described in detail. As shown in FIG. 4, the viewer terminal 300 includes a communication unit 310 for communicating with other devices, an operation unit 320 for receiving user input operations, a storage unit 330 for storing various types of data, a display unit 340 for displaying various types of images, an audio output unit 350 for outputting audio, and a control unit 360 for controlling the entire device. These components are connected to each other via a bus line BL.

The communication unit 310 is a communication interface including a NIC for conducting wired communication or wireless communication. The communication unit 310 communicates with the content distribution server 100 via the network NW.

The operation unit 320 can include, for example, operation buttons, a keyboard, and a pointing device, and is an interface used by the user to input instructions.

The storage unit 330 can be, for example, RAM or ROM. The storage unit 330 stores programs and inputted data for executing various types of control processing.

The display unit 340 can be, for example, an LCD (liquid crystal display) or an EL (electroluminescence) display. The display unit 340 displays text, images, etc. based on data inputted from the control unit 360.

The audio output unit 350 can be composed of, for example, a speaker and an amplifier. The audio output unit 350 outputs audio according to data inputted from the control unit 360.

The control unit 360 can be, for example, a CPU. The control unit 360 controls the entire operation of the viewer terminal 300 by executing a program stored in the storage unit 330.

The functional configuration of the control unit 360 will now be described. The control unit 360 functions as a content acquiring unit 361, a display control unit 362, an audio output control unit 363, and a preference standard information transmitting unit 364.

The content acquiring unit 361 acquires data indicating live content from the content distribution server 100 via the communication unit 310. The display control unit 362 displays video in virtual space on the display unit 340 based on the data indicating live content acquired by the content acquiring unit 361. The audio output control unit 363 outputs audio from the audio output unit 350 based on the data indicating live content acquired by the content acquiring unit 361.

The preference standard information transmitting unit 364 transmits information indicating preference standards set by the user via the operation unit 320 to the content distribution server 100 via the communication unit 310. This information is reflected in the condition information stored in the storage unit 120.

<Configuration of Virtual Character Providing Server>

The configuration of the virtual character providing server 400 will now be described in detail. As shown in FIG. 5, the virtual character providing server 400 includes a communication unit 410 for communicating with other devices, a storage unit 420 for storing various types of data, a clock unit 430 for keeping time, and a control unit 440 for controlling the entire device. These components are connected to each other via a bus line BL.

The communication unit 410 is a communication interface including a NIC for conducting wired communication or wireless communication. The communication unit 410 communicates with a user terminal via the network NW. The user terminal can be, for example, a distributor terminal 200 that acquires information such as a virtual character or a poster terminal (not shown) used by a poster to post information on, for example, virtual characters.

The storage unit 420 can be, for example, RAM or ROM. The storage unit 420 stores programs and inputted data for executing various types of control processing. For example, the storage unit 420 stores information on virtual characters and objects posted by posters.

The storage unit 420 also stores acceptance condition information. The acceptance condition information is information set as a condition subject to an accepted restriction. The acceptance condition information is used when determining whether or not to accept a post. The storage unit 420 also stores information on the user who uses the user terminal (a distributor who uses a virtual character etc.). The storage unit 420 also stores provided condition information. Provided condition information is information set as a condition subject to a provided restriction. Provided condition information is used to determine whether or not to restrict provision when compared to information on the user. This information on the user can be, for example, information indicating the age, nationality, religion, etc. of the user who uses the user terminal (a distributor who uses a virtual character etc.).

The clock unit 430 includes, for example, an oscillation circuit for generating clock signals, a variable PLL, and a counting circuit for counting the number of clock signal pulses. The clock unit 430 keeps time based on the number of pulses counted.

The control unit 440 can be, for example, a CPU. The control unit 440 controls the entire operation of the virtual character providing server 400 by executing a program stored in the storage unit 420. The control unit 440 executes various types of controls on a timing based on the number of pulses counted by the clock unit 430. The control unit 440 also determines whether or not a predetermined period of time (for example, a delivery period or an availability period) has elapsed based on the time kept by the clock unit 430.

The functional configuration of the control unit 440 will now be described. The control unit 440 functions as an information providing unit 441, a post receiving unit 442, a provision control unit 443, and a user information acquiring unit 444.

The information providing unit 441 provides, for example, character information, first additional information, object information, and second additional information to the distributor terminal 200 via the communication unit 410. The post receiving unit 442 receives posts on, for example, character information, first additional information, object information, and second additional information from a poster terminal via the communication unit 410.

The information providing unit 441 restricts provision of this information when information on the user who wishes to download the character information and object information satisfies a condition indicated by the provision condition information stored in the storage unit 420.

Specifically, the information providing unit 441 limits provision of information from undesirable users by performing filtering at the destination of the information on virtual characters and objects based on provision condition information. The information providing unit 441 may provide site certification from the virtual character providing server 400 together with character information as a set. This site certification information may be used as a basis for determining restrictions when downloaded by the user and used in distributed content.

The post receiving unit 442 rejects a post when the posted character information or object information satisfy a condition indicated by the reception condition information stored in the storage unit 420.

The provision control unit 443 performs controls so that the information providing unit 441 does not provide character information or object information outside of the distribution period. Also, the provision control unit 443 notifies the user terminal attempting to download the character information or object information of the distribution period and the availability period.

The user information acquiring unit 444 acquires information on the user attempting to download character information or object information using the user terminal.

FIG. 6 is a table showing an example of information provided by the virtual character providing server 400. The information provided by the virtual character providing server 400 includes a poster ID indicating the poster who posted the character information or object information, information ID uniquely assigned to posted information, type information indicating whether the information is character information or object information, delivery status for the delivery period, the size (amount) of the information provided, remarks related to first additional information or second additional information, and a URL providing download services for character information and object information. These pieces of information are associated with each other and stored in the storage unit 420.

A remark is information suggesting that the user may face restrictions when using the distributed content. For example, a remark may include attribute information and certification information on character information and object information. For example, it may indicate that there is expression of sexuality, restrictions by nationality, religious content, or restrictions on the display and use of, for example, tobacco. When the user is not subject to restrictions, information indicating that there are no restrictions is shown.

<Specific Example of Video and Distribution Screens>

Specific examples of video and distribution screens displayed based on information indicating that live content is being streamed will now be described. A specific example of a display restriction method will also be described.

FIG. 7 is a diagram showing an example of video in virtual space displayed on a distributor terminal 200. A virtual character 10 of another distributor and an object 30 indicating the table are displayed in the video of virtual space displayed on the distributor terminal 200. However, the virtual character 10 is not wearing clothes. In this example, the virtual character is displayed on the distributor terminal 200 but display restrictions are imposed on the distributed content.

In a first example of a distribution screen displayed on a viewer terminal 300 shown in FIG. 8, the virtual character 10 is displayed wearing clothes 20 after change processing has been performed as shown in region A1.

FIG. 9 shows an example of a distribution screen displayed on a viewer terminal 300, which differs from the example shown in FIG. 7 and FIG. 8. In this example, the virtual character 50 of the distributor is displayed. However, the object 40 is subject to restriction. Therefore, pixelization 60 is superimposed on the object 40. The object 40 can be, for example, a cigarette that a minor should not see or the portrait of a head of state whose use is restricted by nationality.

<Processing Flow>

An example of control processing executed by the content distribution server 100 will now be described with reference to FIG. 10. This processing is executed when a distributor terminal 200 logs in to the content distribution server 100 and starts preparing for the distribution of live content.

First, the information acquiring unit 141 in the control unit 140 acquires various types of information from the distributor terminal 200 via the communication unit 110 (step S101). The various types of information can be, for example, information used by the distributor to distribute content, such as character information, first additional information, object information, and second additional information.

The restriction unit 144 in the control unit 140 references the condition information stored in the storage unit 120 and compares it to the first additional information or second additional information acquired by the information acquiring unit 141 (step S102). Here, the restriction unit 144 in the control unit 140 determines whether or not the first additional information or the second additional information satisfies the conditions indicated by the condition information (step S103).

When the restriction unit 144 in the control unit 140 has determined that the first additional information or the second additional information satisfies a condition indicated by the condition information (step S103; Y), the restriction unit 144 restricts the display or use of the virtual character or object. (Step S104).

However, when the restriction unit 144 in the control unit 140 has determined that the first additional information or the second additional information does not satisfy a condition indicated by the condition information (step S103; N), the process advances to step S105 without executing step S104.

Next, the distribution unit 143 in the control unit 140 displays synthesized video on the distributor terminal 200 (step S105). Specifically, the information acquiring unit 141 in the control unit 140 acquires motion information from the distributor terminal 200 via the communication unit 110. The video generating unit 142 in the control unit 140 generates video in virtual space that synthesizes movement by the distributor as movement by the virtual character. The distribution unit 143 in the control unit 140 transmits information indicating synthesized video in virtual space to the distributor terminal 200 via the communication unit 110. When a plurality of distributors distributes content using a distributor terminal 200, information indicating video from the viewpoint of the virtual characters used by each of the distributors is distributed.

The distribution unit 143 in the control unit 140 also distributes live content to a viewer terminal 300 based on the synthesized video in virtual space (step S106). This live content is information indicating video from the viewpoint of a virtual camera. When display is restricted, the distribution unit 143 in the control unit 140 displays video subject to changes on the viewer terminal 300.

<Explanation of Effects>

In the content distribution system 1 of the present embodiment, the content distribution server 100 acquires character information and first additional information. The content distribution server 100 generates video in virtual space based on the character information and first additional information, and distributes live content based on the video. In other words, the content distribution server 100 can distribute live content in response to additional information set for a virtual character.

In this case, when a plurality of distributors is separated from each other in real space, video can be distributed in which virtual characters corresponding to the distributors are displayed together in live content. For example, in the case of a plurality of distributors who produce different distributed content, character information and first additional information can be transmitted to the content distribution server 100 of the one distributor producing distributed content including the other distributors so that they can participate in that distributor's distributed content. In this way, virtual characters created by a plurality of distributors can readily appear in other distributed content. The use or display of undesirable virtual characters can also be restricted in distributed content based on the first additional information.

The content distribution server 100 also acquires object information and the second additional information from the virtual character providing server 400. The content distribution server 100 generates video in virtual space based on the object information and the second additional information, and distributes live content based on this video. In other words, the content distribution server 100 can distribute live content in response to additional information set for an object.

In this case, when a plurality of distributors is separated from each other in the real space or when a plurality of distributors is producing different distributed content, an object can be brought into distributed content by transmitting object information and second additional information to the content distribution server 100 of the one distributor producing distributed content including the other distributors. In this way, objects created by a plurality of distributors can readily appear in other distributed content. The use or display of undesirable objects can also be restricted in distributed content based on the second additional information.

The description of the embodiment has ended, but this embodiment is merely an example. Therefore, the specific configuration of the content distribution system 1 and the processing details etc. are not limited to those described in the embodiment. Modified examples of the embodiment will now be described.

MODIFIED EXAMPLES

In the content distribution system 1 of the embodiment, the distributor terminal 200 and the viewer terminal 300 have different configurations and can be distinguished from each other. However, the individual components in each of these devices may be combined to form devices serving as a distributor terminal 200 and a viewer terminal 300.

In the example shown in FIG. 10, the use or display of undesirable virtual characters and objects in distributed content is based on condition information. However, the decision to impose restrictions may be made by the distributor instead of by condition information. For example, the instruction receiving unit 145 in the content distribution server 100 may receive an instruction to allow or deny display or use from the distributor terminal 200, and give priority to the instruction regarding whether to allow or deny display or use.

Restrictions on the use or display of virtual characters and objects (how and what is restricted) may be set at any time. For example, these settings may be changed dynamically during the distribution of content or may be set before distribution of the content. Display restrictions (how and what is restricted) may be set for each individual user. For example, when a child is near the viewer of distributed content, the viewer can set age-related instructions on the display of a virtual character. The viewer can change a setting based on consistency between attribute information and character information. However, it is usually not the users but the devices in the content distribution system 1 that automatically determine whether or not virtual characters and objects are subject to restriction, and that uniformly apply restrictions based on the results of the determination.

In the content distribution system 1 described in the embodiment, the video generating unit 142 in the content distribution server 100 generates video in virtual space in which movement by the distributor is synthesized as movement by a virtual character. However, the content distribution server 100 may be configured without a video generating unit 142.

For example, the distributor terminal 200 may generate the video and transmit the video data to the content distribution server 100, and the content distribution server 100 may distribute live content based on the video data acquired from the distributor terminal 200. Also, processing substantially similar to the processing performed by the video generating unit 142 may be performed by the content distribution server 100 working with the distributor terminal 200. In this configuration, the processing burden on the content distribution server 100 can be reduced as compared to when the content distribution server 100 generates video in virtual space.

When distributed content is produced by a configuration in which the distributor terminal 200 generates the video, a participant terminal participating in the distributed content (for example, a distributor terminal 200 used by a distributor or a viewer terminal 300 used by a viewer participating in the distributed content) acquires motion information and character information from the participant, generates video that reflects the movements of the participant as movements by a virtual character, and sends the video to the content distribution server 100. The content distribution server 100 then transmits the video data to the distributor terminal 200 used by the main distributor of the distributed content in which the participant is participating. The distributor terminal 200 used by the main distributor acquires the motion information and character information from the main distributor, generates video in virtual space, and synthesizes the video with video data from participants acquired from the content distribution server 100.

In this way, video data can be generated that shows the main distributor together with the participants. The distributor terminal 200 of the main distributor transmits the synthesized video data to the content distribution server 100, and the content distribution server distributes live content based on the video data.

In addition, the participant terminal may transmit character information, motion information, and additional information etc. from the participant to the content distribution server 100 without video being generated by the participant terminal, the content distribution server 100 may transmit this information to the distributor terminal 200 used by the main distributor, and the distributor terminal 200 generates video reflecting both motion information from the participant and motion information from the main distributor in a single virtual space. In this way, video data showing the participant and the main distributor together can be generated, and the content distribution server can distribute live content based on this video data.

When the distributor terminal 200 generates video, the distributor terminal 200 can transmit first additional information and second additional information while transmitting the generated video data. In this way, the content distribution server 100 can identify the additional information and restrict the display or use of virtual characters and objects.

As a result, the content distribution server 100 does not have to include a video generating unit 142 to generate video in virtual space, but may simply acquire video in virtual space synthesizing movement by the distributor (or by a participant) as movement by a virtual character, and distribute live content based on the video.

The content distribution server 100 also does not have to distribute video data as live content. For example, the distribution unit 143 in the content distribution server 100 may distribute live content for synthesizing video in virtual space in which information from the distributor is used as information for a virtual character. In this case, the information required for the synthesis processing is distributed, and the viewer terminal 300 or distributor terminal 200, etc. receiving the information synthesizes (renders) video based on first additional information and second additional information, and displays the video.

When the content distribution server 100 distributes video data as live content, different live content may be distributed based on disclosure restriction settings depending on the destination of the distributed content. In this case, the viewer terminal 300 or the distributor terminal 200 etc. receiving the data, simply displays video based on the received data. In other words, the content distribution server 100 restricts the display of a virtual character etc. based on the first additional information and the second additional information received during distribution. However, when the content distribution server 100 distributes live content for synthesizing video, the viewer terminal 300 or the distributor terminal 200 etc. receiving the live content performs the synthesizing process based on the received data. In this case, the content distribution server 100 distributes the same live content and executes processing to restrict the display of a virtual character etc. on the receiving terminal based on the received first additional information and second additional information.

The functions of the content distribution system 1 in the present disclosure may also be realized by, for example, a computer executing a program instead of devices described above. The program for realizing the functions of the content distribution system 1 may be stored on a computer-readable medium such as USB (universal serial bus) memory, a CD-ROM (compact disc-read only memory), a DVD (digital versatile disc), or an HDD (hard disc drive), or may be downloaded to a computer via a network.

A preferred embodiment of the present disclosure was described above, but the present disclosure is not limited to this embodiment, and the present disclosure encompasses the invention described in the claims and that which is equivalent. Also, the configurations of the devices described in the embodiment and modified example can be combined when appropriate as long as there are no technical contradictions.

KEY TO THE DRAWINGS

1: Content distribution system
100: Content distribution server
200: Distributor terminal
300: Viewer terminal
400: Virtual character providing server
120, 230, 330, 420: Storage unit
130, 430: Clock unit
140, 280, 360, 440: Control unit
141: Information acquiring unit
142: Video generating unit
143: Distribution unit
144: Restriction unit
145: Instruction receiving unit
220, 320: Operation unit
110, 210, 310, 410: Communication unit
240, 340: Display unit
281, 361, 481: Content acquiring unit
282, 362, 482: Display control unit
283, 363, 483: Audio output control unit
284, 364: Preference standard information transmitting unit
285: Character information transmitting unit
286: Inputted information transmitting unit

The invention claimed is:

1. A content distribution server comprising:
an information acquiring unit configured to acquire character information indicating a virtual character used by a distributor in virtual space and first additional information added to the character information;
a distribution unit configured to distribute live content for synthesizing video in virtual space with movement by the distributor as movement by the virtual character based on the character information and the first additional information acquired by the information acquiring unit;
a storage unit configured to store information set as conditions for restriction;
a restriction unit that restricts the display or use of the virtual character when the first additional information acquired by the information acquiring unit satisfies a condition indicated in the condition information stored in the storage unit; and
a distributor terminal configured to display the virtual character,
wherein the restriction unit enforces a restriction on display of the virtual character on a viewer terminal configured to allow viewing of the distribution.

2. A content distribution server according to claim 1, wherein the condition information includes information set based on one or more of public order and moral decency standards and preference standards for the distributor or a viewer viewing the distribution.

3. A content distribution server according to claim 2, wherein the preference standards include standards that prohibit or limit the use of the same virtual character by a plurality of distributors in virtual space.

4. A content distribution server according to claim 1, wherein the restriction unit is configured to execute a change process for making changes to the virtual character when display of the virtual character is restricted.

5. A content distribution server according to claim 1, wherein the information acquiring unit is further configured to acquire object information indicating an object used by the distributor in virtual space and second additional information added to the object information, and the restriction unit is configured to restrict display or use of the object when the second additional information acquired by the information acquiring unit satisfies a condition indicated by the condition information stored in the storage unit.

6. A content distribution system comprising:

a content distribution server configured to distribute live content based on video in virtual space that synthesizes movement by a distributor as movement by a virtual character;

a virtual character providing server configured to provide character information indicating the virtual character and first additional information added to the character information;

a viewer terminal; and a distributor terminal, wherein the content distribution server is configured to distribute live content for synthesizing video in virtual space with movement by the distributor as movement by the virtual character based on the character information and the first additional information acquired from the virtual character providing server, wherein first condition information indicating a condition to be restricted is stored, wherein second condition information indicating that the first additional information is satisfied is stored, wherein the distributor terminal is configured to display the virtual character, and wherein the viewer terminal is configured to restrict display or use of the virtual character.

7. A content distribution method comprising:

acquiring character information indicating a virtual character used by a distributor in virtual space and first additional information added to the character information; and distributing live content for synthesizing video in virtual space with movement by the distributor as movement by the virtual character based on the character information and the first additional information acquired in the information acquisition step;

storing condition information corresponding to a condition to be restricted, limiting the display or use of the virtual character on a viewer terminal when the first additional information satisfies a condition indicated by the stored condition information; and displaying the virtual character on a distributor terminal.

* * * * *